Fig. I.

Patented July 9, 1929.

1,720,518

UNITED STATES PATENT OFFICE.

ALAN VARLEY LIVINGSTON, OF NEW HAVEN, CONNECTICUT, ASSIGNOR TO THE SAFETY CAR HEATING & LIGHTING COMPANY, A CORPORATION OF NEW JERSEY.

STORAGE-BATTERY-CHARGING SYSTEM.

Application filed January 17, 1925. Serial No. 2,988.

This invention relates to the charging and protection of storage batteries, more particularly to the charging and protection of storage batteries as are, for example, used for auxiliary purposes on electrically propelled vehicles, such as for lighting emergency or signal lights, for supplying energy for the remote or multiple unit control of cars or trains, and the like.

An object of this invention is to provide a simple and reliable system and apparatus for charging a storage battery from the relatively high voltage power or transmission circuit of an electrically propelled vehicle and to provide a system of the above nature which will be economical and efficient in operation, thoroughly dependable in action, and capable of effectively safeguarding the battery against overcharge. More particularly, it is an object of this invention to provide a system and apparatus of the above nature in which waste of energy is avoided, in which the charge to the battery is reliably controlled, and in which the batteries of the cars or units of the train of cars are effectively and dependably prevented from undesired interaction one upon another. Another object is to provide a system of the above character of automatic action throughout and well adapted to meet the conditions of long and hard practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
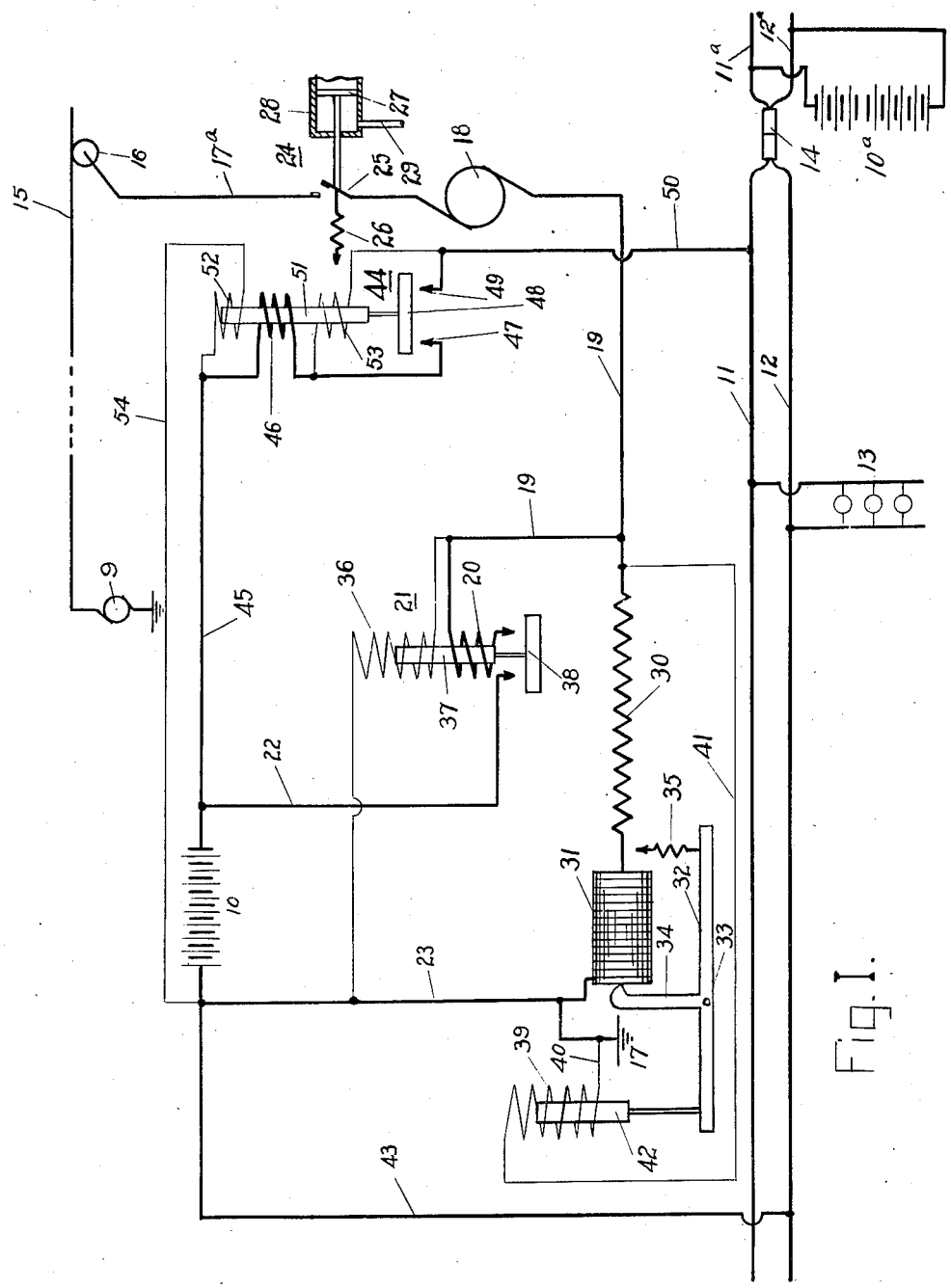
Figure 2:
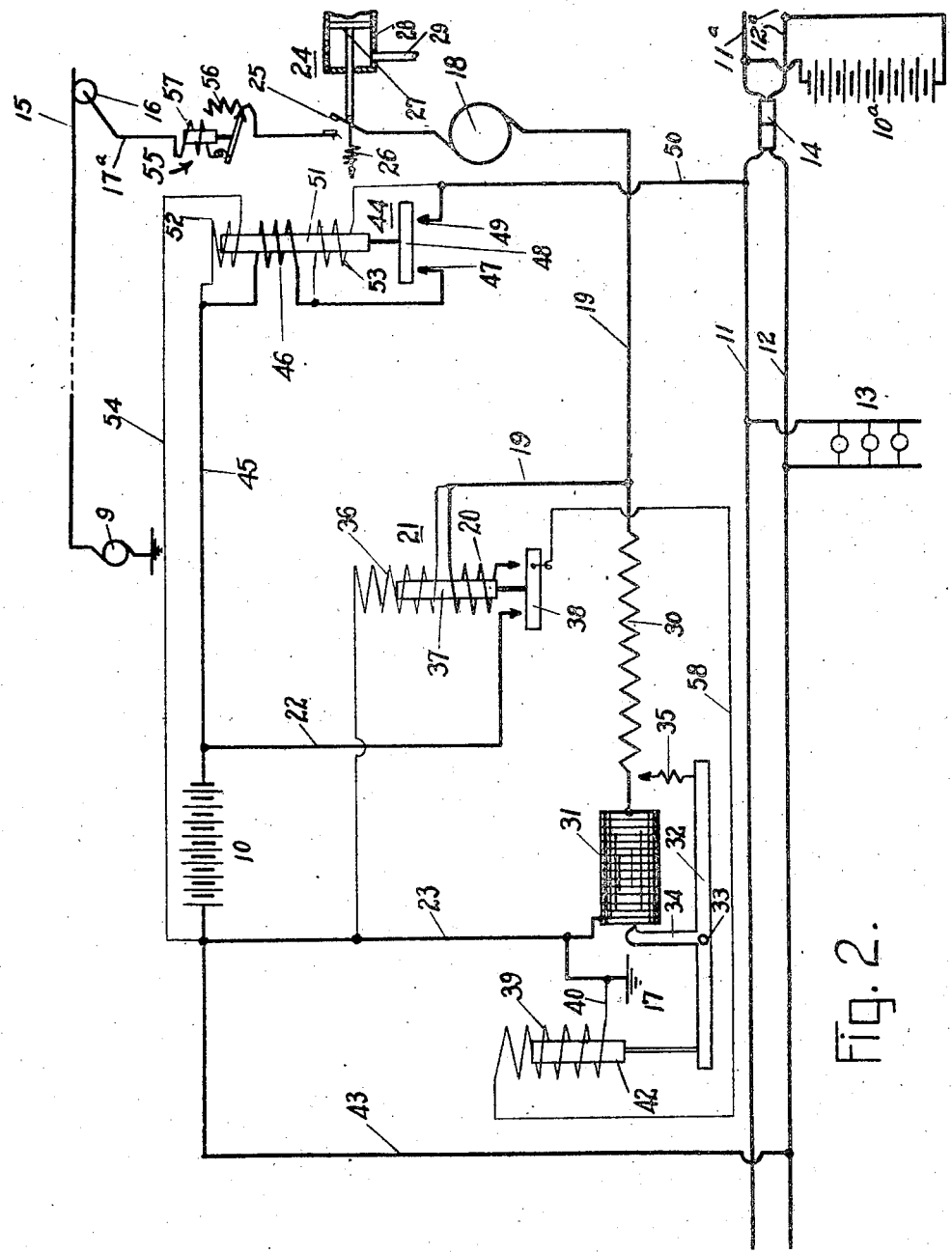

In the accompanying drawings there is diagrammatically illustrated in Figure 1 a preferred embodiment, and in Figure 2 another possible form, of this invention.

Similar reference characters refer to similar parts throughout the various views in the drawings.

As conducive to a clearer understanding of this invention, it may at this point be noted that, in electrically propelled vehicles, particularly such as are used in subway or elevated service, for example, and in which most if not all of the cars or units of the train are self-propelled, there is provided a storage battery for supplying energy to the remote or multiple unit control system, for supplying energy to emergency lights, signal lights, and the like. This battery, one for each car or vehicle, is of relatively low voltage as compared with the voltage of the power or transmission circuit from which the cars or trains derive their propelling energy.

By way of example, the storage battery may be a 16-cell battery, in which case the voltage necessary to charge the battery may be in the neighborhood of 40 volts; the power or transmission circuit may be, for example, 600 volts. To charge this relatively low voltage battery from this relatively high voltage source of charging current through an appropriate resistance, as is not infrequently the practice at present, is exceedingly wasteful of energy in the resistance itself, and if the charging current were to be, for example, 5 amperes, it will be readily seen that the energy loss in this resistance per battery will amount to about 2800 watts. With, for example, a ten-car train, the loss of energy during charging periods will amount to about ten times this value or about 28 kilowatts. It is among the dominant aims of this invention to provide a system and apparatus for charging the storage battery without entailing high and hence uneconomical losses, and at the same time to reliably and dependably protect the storage battery against overcharge.

Referring now to Fig. 1 of the drawings, there is shown at 10 a storage battery intended to serve what may be termed the "train line", indicated by the conductors 11 and 12, and from which emergency lamps or signal lamps indicated at 13, or other devices, such as the remote or multiple unit control devices, receive their energy. Train line conductors, such as the conductors 11—12, will be understood to extend through each vehicle or car of the train and the "train line" is completed by coupling the train line conductors of each car to those of a succeeding car. Thus, there is diagrammatically indicated at 11ª and 12ª the train line conductors of a succeeding car, coupled to the train line conductors 11—12 of the one car through any suitable coupling device indicated at 14. The train line conductors 11ª and 12ª of an adjacent car will have connected to them, in any suitable manner, a storage battery as indicated diagrammatically at 10ª.

The power or transmission line, from which the train receives its motive power, may take any suitable form, and is indicated at 15 in connection with a suitable source of current 9. A current collecting device, shoe or trolley 16, in contact with the line 15, transmits energy from the source 9 to the vehicle for utilization, the circuit being eventually completed at the ground indicated at 17. The charging circuit of the battery 10 includes the conductor 17$^a$ leading from the current collecting device 16, a translating device shown in the form of the motor 18, conductor 19, coil 20 of an automatic switch generally indicated at 21, conductor 22, to battery 10, this charging circuit being completed to ground by way of conductor 23. The motor 18 preferably takes the form of the motor driving the air compressor on the car and this motor 18 is made automatically to maintain a supply of compressed air, at suitable pressure, for use, for example, in operating the brakes of the vehicle. The circuit of the motor 18 is governed by a pressure controlled switch diagrammatically and generally indicated at 24, and the latter may be of any convenient construction. For purposes of illustration, the switch member 25 is acted upon by means of a spring 26 tending to close the switch member 25, and the action of the spring 26 is opposed by the piston 27, operating in the cylinder 28, the latter being supplied with air from the usual storage vessel by means of the pipe 29. Thus, as the pressure on the air supply system drops, the spring 26 will be effective to close the circuit of the motor 18, the latter thus, through the compressor driven thereby, restoring the pressure on the system to the normal value determined by the tension of the spring 26.

Shunted about the storage battery 10 is a suitable resistance unit, preferably variable. This resistance unit conveniently takes the form of a fixed resistance 30 and a variable resistance 31, the latter being preferably of the carbon disk type. A lever 32 pivoted as at 33 is provided with an arm 34 adapted to bear against the movable end of the carbon pile 31 and at one end of the lever 32. conveniently at the right-hand end, as viewed in the drawing, there is made active a spring 35 tending to relieve the pressure of the arm 32 upon the movable or free end of the carbon pile 31, thus maintaining the resistance of the carbon pile 31, and hence of the resistance unit 30—31, relatively high. Thus, as the switch member 25 of the pressure controlled switch 24 is closed, the circuit of the compressor motor 18 will be completed to the ground at 17 through the resistance elements 30—31, held by the spring 35 at a relatively high value in ohmic resistance. The rush of starting current to the motor 18, through the relatively high value of resistance of the resistance unit 30—31 results in the production across the terminals of the resistance unit 30—31 of a suitably high potential drop effective at once to energize the coil 36 of the automatic switch 21; the coil 36 at once lifts the core 37, thus bridging the contacts of the switch 21 through the conducting bridging member 38. The storage battery 10 is thus connected in series with the compressor motor 18, and is placed in condition to receive charging current from the transmission line 15 and source 9. The resultant flow of charging current to the battery through coil 20 of the switch 21 is effective to hold the switch 21 in closed position.

As soon, however, as the switch 24 is closed, as hereinabove described, a voltage coil 39, having one terminal thereof connected to one pole of the battery 10, as by way of the conductors 40 and 23, becomes effective to control the pressure on the carbon pile 31, and hence to control the value of the resistance of unit 30—31 shunted about the battery 10 and the voltage drop through the resistance 30—31; thus, the conductor 41 leading from the other terminal of the coil 39 and connected to conductor 19 completes the circuit of the coil 39 and its initial action is to prevent an excessively high voltage across the resistance 30—31 so as to avoid an excessively high initial rush of current to the battery 10 upon the closure of switch 21. But as soon as switch 21 is closed, coil 39 is bridged across the battery 10, and hence will be responsive to the voltage across the latter. The charging of the battery 10 may thus proceed, it being noted that, of the relatively high potential of the source of energy or of the power circuit as compared with the relatively low voltage of the storage battery 10, the necessary reduction is brought about not through wasteful resistance devices, but through the voltage necessary to operate the motor 18. Furthermore, the motor 18, irrespective of its type, has connected to it a substantially constant load, and will thus draw a substantially constant current, as long as it is in operation. The storage battery 10 is thus safeguarded, by the current-limiting action of the motor 18, against too high a charging rate. It may further be pointed out that the charging current flowing to the battery as compared to the current flowing through the motor 18, may be conveniently predetermined, if desired, by means of the resistance unit 30—31; the latter may be given such a value or its value determined, as by adjustment of the tension of spring 35 against which the coil 39 acts, that substantially all or only a part of the current in the motor circuit passes through the battery. In this manner, the division of the current in the motor circuit between the battery 10 and the shunted resistance may be preliminarily predetermined to suit the characteristics of the battery 10 itself.

As the battery 10 approaches a state of substantially full charge, the voltage necessary to continue the charging of the battery rises somewhat abruptly; as the voltage of the battery 10 is thus increased, the coil 39, responsive to battery voltage, is strengthened and, acting upon the lever 32 through the core 42 increases the pressure on the carbon pile 31, thus decreasing the resistance of the resistance unit 30—31 shunted about the battery. This decrease in resistance is at once effective to bring about a readjustment of the division of current between the battery 10 and the resistance unit 30—31, so that the latter is made to carry more current than is passed to the battery. Preferably, the action of the coil 39 is so predetermined, as by adjustment of the tension of the spring 35, that at substantially full charge of the battery 10, the coil 39 will maintain such a value of resistance in the unit 30—31 that the potential drop therethrough will be substantially equivalent to the voltage of the battery, the flow of charging current to the battery being thus substantially cut off. Thus, it will be seen that the battery is protected against overcharge as well as against too high a charging rate.

Should the automatic pressure controlled switch 24 open the circuit of the motor 18 at any time during the charge of the battery or after the battery has been fully charged, the battery 10 will momentarily discharge through the coil 20 of the switch 21, and into the resistance unit 30—31; this reversal in the flow of current through the coil 20 will oppose the holding effect of the coil 36 upon the core 37 and cause the latter to be released by the coils, and the switch 21 thus opened.

As hereinbefore noted, the train line conductors 11—12 of one car are coupled to the train line conductors 11ª and 12ª of a succeeding car; the train line conductors of the latter car will have connected thereto a storage battery, as indicated at 10ª. Thus the train line will have connected to it as many storage batteries as there are cars or units in a train, and these storage batteries will thus, because of differences in their states of charge, tend to interact one upon the other; particularly is this the case where the storage battery of one car is of the lead type and the storage battery of another car is of the Edison type, these two types of batteries having widely different voltage characteristics. For example, the charging voltage appropriate to fully charging a battery of the Edison type is materially higher than the voltage appropriate for charging a battery of the lead type. If two such batteries are under such conditions connected in common to the same train line, the battery of higher voltage will discharge into the battery of lower voltage or the battery of lower voltage will receive charging current from the charging circuit of the battery of higher voltage without the apparatus associated with the former being capable of guarding against undesired charge from sources of current connected to the train line. Accordingly, there has been provided in this invention apparatus for preventing such undesired and detrimental effects from taking place.

The battery 10 has one pole thereof connected to the conductor 12 of the train line through a conductor 43; the other pole of the battery 10 is connected to the other conductor 11 of the train line through an automatic switch generally indicated at 44. The circuit from this other pole of the battery 10 to the conductor 11 of the train line, more specifically, includes the conductor 45, the current coil 46 of the switch 44, swith contact 47, bridging member 48 of the switch 44, switch contact 49 and conductor 50. The bridging member 48 of the switch 44 is mechanically connected to a core 51, the movement of which is controlled by the coil 46 and also by coils 52 and 53. Normally the bridging member 48 is in electrical connection with the two switch contacts 47—49, so that the discharging circuit of the battery 10 to the work circuit or train line conductors 11—12 is normally complete; the battery 10 may thus supply energy to whatever devices are served by the work circuit or train line conductors 11—12.

The coil 52 of the switch 44 is connected across the battery 10, as by the conductor 45 and the conductor 54; this coil 52 is normally energized but is so proportioned with respect to the movable portions of the switch 44 that it tends to open the switch, but is not quite powerful enough to do so. The coil 52 and the coil 46 are so wound one with respect to the other, that current flowing through the coil 46 from the battery 10 to the train line produces in the coil 46 a magneto-motive-force opposing that of the coil 52; thus, the switch 44 is positively maintained closed during periods of discharge of the battery 10.

The coil 53 of the switch 44 is connected across the contacts 47—48 of the switch 44, and when the switch 44 is in closed position this coil 53 is deenergized. Assuming, however, that the voltage of the train line conductors 11—12 is raised above that of the battery 10, as for example by reason of an Edison type of storage battery (with higher voltage characteristics) being associated with a succeeding car, the latter or higher voltage battery (which may be considered to be that battery indicated at 10ª, for example) will begin to force a charging current into the battery 10; this action will result in a reversal of the direction of flow of current through the coil 46 of the switch 44, whereupon the coil 46 is at once effective to assist the coil 52, the two coils 46 and 52 thus at once lifting the core 51 and thus opening the circuit at the contacts 47—49. As soon as the switch 44 is thus opened, the coil 53 is at once energized, this coil being wound with respect to the coil 52 so that the former will aid the latter. The coil 53 will thus assist the coil 52 sufficiently to insure holding the switch 44 open, and it will be seen that the battery 10 is thus effectively safeguarded against receiving a charge from the train line circuit and against which charge the battery 10 is otherwise unprotected.

The switch 44 will remain in open position as long as the voltage across the train line conductors 11—12 exceeds the voltage of the battery 10, for under these conditions the holding coil 53 of the switch 44 will remain energized. Should the voltage across the train line conductors 11—12 approach or equal the voltage of the battery 10 in the one car, the holding coil 53 will become substantially weakened and will permit the switch 44 to close, thus connecting the storage battery 10 to the train line conductors 11—12. Such connecting action, however, will be seen to be permitted to take place only after conditions in the train line circuit have been substantially equalized with respect to the voltage of the battery 10, and brought to such a state that the battery 10 can supply energy to the train line, but cannot receive energy therefrom.

As hereinbefore noted, the voltage-regulating coil 39 is preferably bridged across the resistance unit 30—31 so that the coil 39 through its action upon the carbon pile 31 may effectively prevent an abnormally high voltage drop across this resistance unit, due to the rush of starting current to the motor 18, and thus to prevent a high initial rush of charging current to the battery 10. This arrangement is, for these and other reasons, particularly advantageous where the translating device, such as the motor 18, is characterized by a substantial rush of current when its circuit is closed. Should the translating device, however, take some other form, so that such an initial rush of current is not a characteristic of the device or of its circuit, the voltage-regulating coil 39 is preferably arranged as is illustratively shown in Fig. 2. In both Figs. 1 and 2 like reference characters refer to similar parts throughout.

Turning now to Fig. 2, the translating device is shown in the form of a motor 18 but has included in its circuit any suitable form of starting device, preferably automatic, whereby the starting current to the motor is maintained within normal values. This automatic device is generally indicated at 55 and is diagrammatically shown as including a variable resistance 56 controlled by a current coil 57 included in the circuit of the motor 18. The voltage-regulating coil 39 active upon the carbon pile 31 is, as distinguished from the arrangement shown in Fig. 1, connected by conductor 58 to the bridging member 38 of the automatic switch 21. The voltage coil 39 is thus prevented from affecting the value of the resistance unit 30—31 until the flow of current to the translating device or motor 18, upon the closure of the switch 24, and under the control of the device 55, has permitted a high enough voltage drop to be produced across the resistance unit 30—31 to close the automatic switch 21. The ohmic resistance of the resistance unit 30—31 is thus maintained relatively high, it being noted that the spring 35 acts (when the coil 39 is de-energized) to relieve the pressure upon the pile 31 and hence to hold its resistance at a relatively high value. The closure of the switch 21 is thus reliably assured; and as soon as it is closed, the regulating coil 39 is placed in condition to be responsive to the voltage across the battery 10 and to control the charge thereto, as already hereinbefore described in connection with Fig. 1. In other respects the operation of the system shown in Fig. 2 is similar to that of the arrangement of Fig. 1.

It will thus be seen that there has been provided in this invention a system and apparatus by means of which the storage battery may be efficiently and economically charged from the relatively high voltage source of supply, and that the storage battery is reliably and dependably safeguarded against overcharge. Moreover, it will be seen that these advantages are achieved without interfering with the desired action or operation of the compressor motor itself, and also without waste of large amounts of energy in resistance devices or the like. It will also be noted that the battery of each car or vehicle may be dependably protected against undesired interaction with batteries of other cars of the train; and that all of the above advantages, together with many others, are achieved in a thoroughly practical manner.

As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim as my invention:

1. In apparatus of the character described, in combination, a storage battery, a source of current for charging said battery and adapted to be connected thereto, a shunt resistance around said battery, means operable during the charging of said battery to control the division of current between said shunt resistance and said battery so as to prevent charging of the battery at an excessive rate, and means responsive to current flowing from said battery to said shunt resistance for disconnecting the resistance from the battery.

2. In apparatus of the character described, in combination, a storage battery, a source of current for charging said battery and adapted to be connected thereto, a shunt resistance around said battery, means operable during charge of said battery to shunt such an amount of current from said source through said resistance as to prevent an excessive charging rate of current flow to said battery, and connecting mechanism between said battery and said shunt resistance responsive to charging voltage to connect the battery to said source and responsive to current flowing from said battery to said resistance to disconnect the battery from said resistance.

3. In apparatus of the character described, in combination, a source of current connected to a circuit having included therein a resistance, a storage battery adapted to be connected across said resistance to receive charging current from said source, a switch responsive to effective condition of said circuit for connecting said battery across said resistance, regulating means responsive to the state of charge of said battery for controlling the division of current between said resistance and said battery, said last-mentioned means being controlled by said switch.

4. In apparatus of the character described, in combination, a source of current connected to a circuit having included therein a resistance, a storage battery adapted to be connected across said resistance to receive charging current from said source, a switch responsive to effective condition of said circuit for connecting said battery across said resistance, and regulating means including a voltage responsive coil for controlling the division of current between said resistance and said battery, said switch acting to connect said voltage coil across said battery.

5. In apparatus of the character described, in combination, a source of current connected to a circuit having included therein a variable resistance, a storage battery adapted to be connected across said resistance to receive charging current from said source, an automatic switch responsive to effective condition of said circuit for connecting said battery across said resistance, and means effective after the closing of said switch and upon said variable resistance to control the division of current between the battery and said resistance substantially in accordance with the state of charge of said battery.

6. In apparatus of the character described, in combination, a source of current connected to a circuit having included therein a variable resistance, a storage battery adapted to be connected across said resistance to receive charging current from said source, an automatic switch having a coil connected across said variable resistance for connecting said battery thereto, and a voltage coil arranged to be connected across said battery by the closing of said switch and adapted to control said variable resistance.

7. In apparatus of the character described, in combination, a source of current connected to a circuit having included therein a variable resistance, said resistance being constructed so as to normally be of maximum value, a storage battery adapted to be connected across said resistance to receive charging current from said source, an automatic switch having a closing coil connected across said variable resistance for connecting said battery across said resistance, and means effective after the closing of said switch for varying said resistance to control the division of current between said battery and said resistance in substantial accordance with the state of charge of said battery.

8. In apparatus of the character described, in combination, a source of current connected to a circuit having included therein a variable resistance, said resistance being constructed so as to normally be of maximum value, a storage battery adapted to be connected across said resistance to receive charging current from said source, an automatic switch having a closing coil connected across said variable resistance for connecting said battery across said resistance, and a voltage coil arranged to be connected across said battery by the closing of said switch and adapted to vary said resistance to control the division of current between said battery and said resistance in substantial accordance with the state of charge of said battery.

9. In apparatus of the character described, in combination, a circuit having included therein a source of current, a translating device and a storage battery connected so that when one receives current from said source the other does also; a work circuit having included therein said battery and another source of current; means adapted to affect said first-mentioned circuit to permit said battery to receive charging current from said first mentioned circuit but adapted to prevent said battery from discharging into said circuit; and means adapted to maintain closed said second-mentioned circuit to permit said battery to discharge into said work circuit but adapted to prevent said second-mentioned source from charging said battery.

10. In apparatus of the character described, in combination, a storage battery, a source of current of a voltage materially higher than that of the battery, means adapted to be operated from said source and connected thereto through a variable resistance, said battery being connected in shunt to said resistance, and means responsive to the state of charge of said battery for determining the value of said variable resistance.

11. In apparatus of the character described, in combination, a storage battery and a translating device connected in series across a source of current, means forming a by-pass for current around said battery, and means responsive to the state of charge of said battery for determining the amount of current from said source to be by-passed around said battery.

12. In apparatus of the character described, in combination, a storage battery and a translating device adapted to be connected in series across a source of current, a variable resistance constructed so as to be normally of maximum value, means responsive to the potential drop across said variable resistance for connecting said resistance and said battery in parallel, and means responsive to the state of charge of said battery for decreasing said resistance as the battery approaches full charge.

13. In apparatus of the character described, in combination, a storage battery, a source of current for charging said battery and adapted to be connected thereo, a by-pass circuit around said storage battery, and means responsive to the state of charge of said battery for determining the amount of current by-passed around said battery.

14. In apparatus of the character described, in combination, a storage battery, a source of current for charging said battery and adapted to be connected thereto, a by-pass circuit around said storage battery, means responsive to the state of charge of said battery for determining the amount of current by-passed around said battery, and means responsive to current discharging from said battery through said by-pass for opening said by-pass circuit.

15. In apparatus of the character described, in combination, a power circuit having included therein a translating device adapted to be operated therefrom, a storage battery connected in series with said device, thereby to be charged from said circuit, and means responsive to substantially full charge of said battery for stopping the flow of current to said battery while permitting operation of said device from said power circuit.

16. In apparatus of the character described, in combination, a storage battery adapted to be connected to a load circuit having therein another source of current, a switch for connecting said battery to said load circuit and means controlling said switch comprising a normally energized coil tending to open said switch and a coil responsive to current flowing in the circuit between said battery and said load circuit, said current responsive coil opposing said first-mentioned coil when said battery discharges into said load circuit, thereby to prevent opening of said switch, and assisting said first-mentioned coil when current flows to said battery from said load circuit, thereby to open said switch.

17. In apparatus of the character described, in combination, a storage battery adapted to be connected to a load circuit having therein another source of current, a switch for connecting said battery to said load circuit, means controlling said switch comprising a normally energized coil tending to open said switch and a coil responsive to current flowing in the circuit between said battery and said load circuit, said current responsive coil opposing said first-mentioned coil when said battery discharges into said load circuit, thereby to prevent opening of said switch, and assisting said first-mentioned coil when current flows to said battery from said load circuit, thereby to open said switch, and means for holding said switch open.

18. In apparatus of the character described, in combination, a storage battery adapted to be connected to a load circuit having therein another source of current, a switch for connecting said battery to said load circuit, means controlling said switch comprising a normally energized coil tending to open said switch and a coil responsive to current flowing in the circuit between said battery and said load circuit, said current responsive coil opposing said first-mentioned coil when said battery discharges into said load circuit, thereby to prevent opening of said switch, and assisting said first-mentioned coil when current flows to said battery from said load circuit, thereby to open said switch, and means responsive to a function of the voltage of said load circuit for holding said switch open.

19. In apparatus of the character described, in combination, a storage battery adapted to be connected to a load circuit having therein another source of current, a switch for connecting said battery to said load circuit, means controlling said switch comprising a normally energized coil tending to open said switch and a coil responsive to current flowing in the circuit between said battery and said load circuit, said current responsive coil opposing said first-mentioned coil when said battery discharges into said load circuit, thereby to prevent opening of said switch, and assisting said first-mentioned coil when current flows to said battery from said load circuit, thereby to open said switch, and a coil connected across the contacts of said switch and acting when energized to assist said first-mentioned coil in holding open said switch.

20. In apparatus of the character described, in combination, a storage battery adapted to be connected to a load circuit having therein another source of current, a switch member movable to open or close the circuit of said battery to said load circuit, and electro-magnetic means for moving and holding said switch member into circuit-opening position and adapted to become effective substantially when the voltage of said source exceeds that of said battery.

21. In apparatus of the character described, in combination, a power circuit having included therein a translating device adapted to be operated therefrom, a storage battery connected in series with said device, thereby to be charged from said circuit, and means operative to prevent excessive rate of flow of charging current to said battery without substantially affecting the rate of flow of current from said source through said translating device.

In testimony whereof, I have signed my name to this specification this 12th day of Jan., 1925.

ALAN VARLEY LIVINGSTON.